May 20, 1958      H. W. RATHENAU      2,835,830
REMOTE CONTROL DEVICES FOR ELECTRIC APPLIANCES
Filed March 9, 1956      6 Sheets-Sheet 1

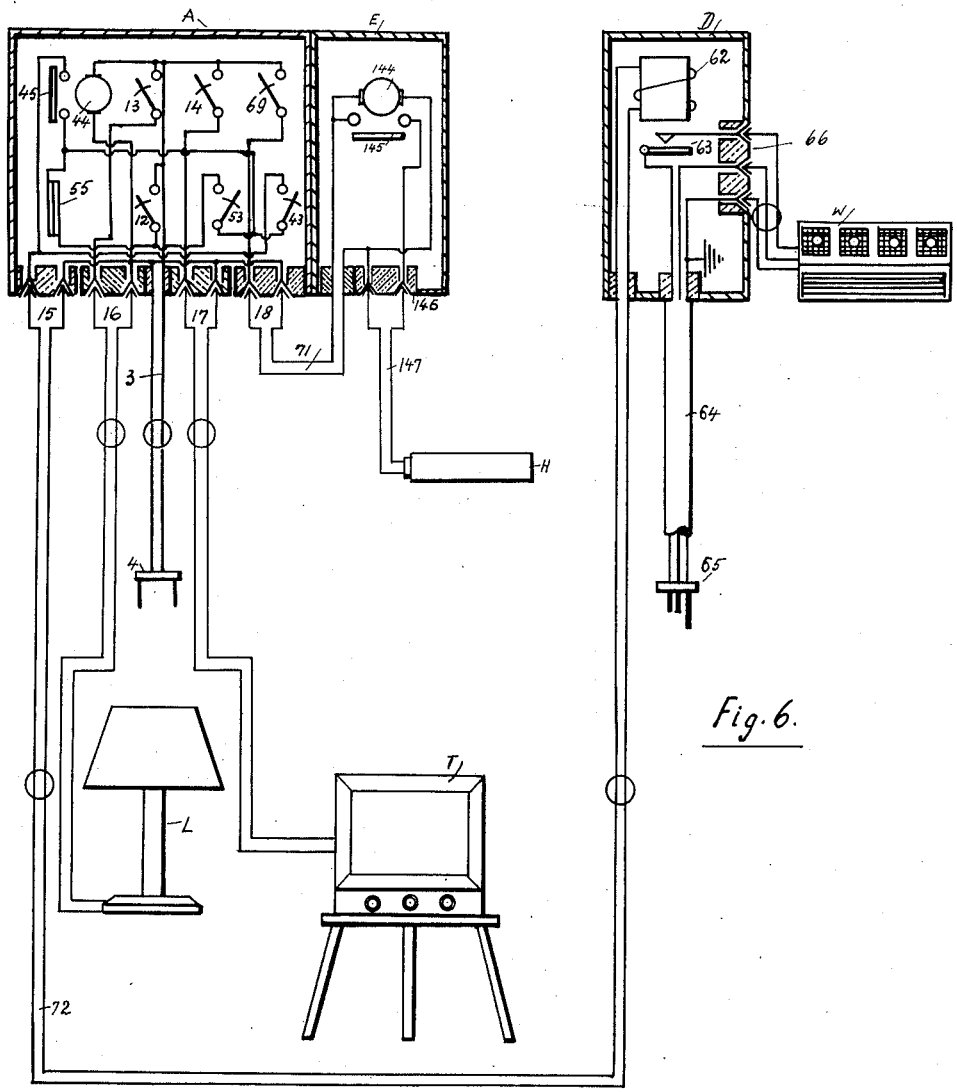
Fig. 6.
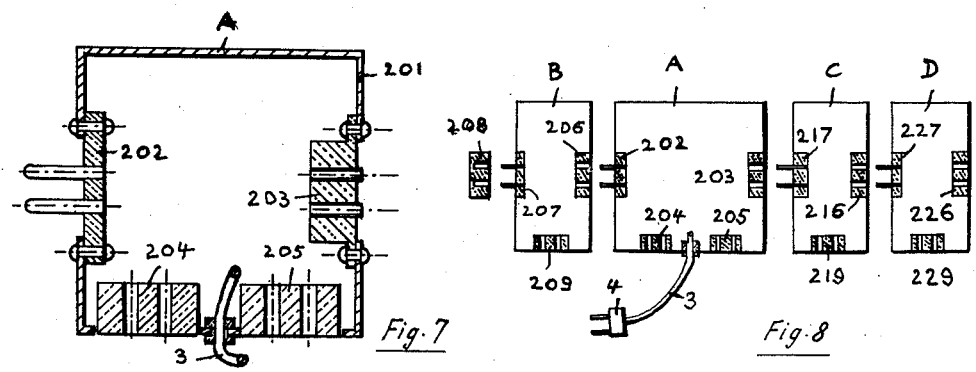
Fig. 7.
Fig. 8.

United States Patent Office 2,835,830
Patented May 20, 1958

2,835,830

REMOTE CONTROL DEVICES FOR ELECTRIC APPLIANCES

Hans W. Rathenau, New York, N. Y.

Application March 9, 1956, Serial No. 570,643

14 Claims. (Cl. 307—114)

My invention relates to the remote control of electric appliances and has for its general object to provide a convenience for the bedroom, sickroom, hotelroom, office or other place of human dwelling, that eliminates the necessity for users of such appliances to leave their bed, seat or other location for the purpose of switching on or off the appliances being used.

Another object of my invention is to devise a control system for the above-mentioned purposes that can readily be added without professional skill to any existing installation and can readily be modified, also by laymen and without requiring special tools, to suit any particular requirements or changes in requirements.

Still another object of my invention is to provide control means, satisfying the above-mentioned aims, that require of the manufacturer the production of only a small number of standard components suitable to be assembled into a single control unit in such a variety of control combinations as to meet any one of a large number of different purposes.

It is also an object, subsidiary to those mentioned, to make such a versatile system applicable not only for the control of low-voltage appliances but also for controlling power equipment such as air conditioners, attic fans, or kitchen ranges without necessity of making any changes in the power appliance itself, yet again by simple means readily applicable by the layman.

To achieve those objects, and in accordance with a feature of my invention, I compose the appliance control system of a number of individual control boxes of respectively different interior equipment but matching each other exteriorly so as to form a system of the building-block type. The boxes, when assembled are mechanically joined together in a row to form a single unit to be mounted on a night table, chair, wall board, or any other location preferred by the user. One of the control boxes; hereinafter called the "main box" houses a number of manually controllable switches or additionally also one or more automatic switches, and is equipped with a number of feeder outlets controlled by the switches. The switches in the main box are supplied with current from a cord that extends out of one of the boxes, preferably from the main box, and is provided with a wall plug for insertion into a utility outlet. The other control boxes of the system, hereinafter called "accessory boxes" are each also equipped with a switch-controlled feeder outlet and they are plugged together with one of the outlets of a preceeding box of the same plural-box unit or into a utility outlet. The switching device in such accessory control box is designed in accordance with a particular purpose or a particular appliance or control operation; and in this respect the accessory boxes of a system may either be alike or may vary from each other. The remaining outlets of the entire group of associated control boxes are available for the selective connection of plugs and cords leading to the various appliances to be controlled.

It will be recognized that in such a system, the number of control boxes as well as their grouping and their particular interior equipment can readily be chosen or varied to meet any desired combination of appliances or any desired type of operation of any of these appliances.

Each switch of the system controls the corresponding appliance, or the feeder outlet for that appliance, either directly or indirectly through the intermediary of relays or contactors mounted in the box itself or in a separate relay box.

The hand operated power switches may be of conventional design, such as toggle-, push-button-, push-pull-, rotary switches. The automatic devices operate as a function of time, temperature, light intensity, noise level or other signals. A combination of hand operated and automatic power switches, acting directly or by means of relays or contactors, is also applicable. For example, the following functions of remote control can be performed by means of a single multiple box assembly: Control of a night light, room light, air-conditioner, fan or attic fan, radio receiving set, television receiver, kitchen range, coffee maker, door opener, as well as a signal light, alarm bell or similar device. Special boxes for the control of electrical appliances with heavy power consumption that would make the use of small control boxes difficult on account of the then necessary bulky switches, cables and wiring devices, can be equipped with built-in or separate relays or contactors.

According to other features of my invention, one or several outlets of the control boxes are equipped with automatic control devices mounted within the box or in a separate unit, such as electric time switches, thermostats, photoelectric cells, or a combination thereof, suitable for direct operation or for indirect operation through the intermediary of built-in or separate relays or contactors.

The automatic operation of a room air-conditioner, for example, can be effected by having a time switch energize the power contactor for the operation of the air-conditioner at a preset time of the day and deenergize the relay after a preset period of time has elapsed. The operation of such a contactor can also be effected by means of a preset or adjustable room thermostat mounted outside of the air-conditioner unit, in proximity of the person or group of persons seeking coolness. Such an arrangement allows for the control of the room temperature as a function of the actual temperature prevailing at the location of the persons rather than as a function of temperature measured within the air-stream of the air-conditioner. The control of the air-conditioner can be made fully automatic by combining the action of the time switch with that of the thermostat.

On the drawings:

Fig. 6 is a schematic wiring diagram of a modified control system.

Fig. 7 shows diagrammatically and in section a different design of a main control box appertaining to a modified control-box system; and Fig. 8 shows schematically and in exploded form an example of the modified system.

Figure 1:
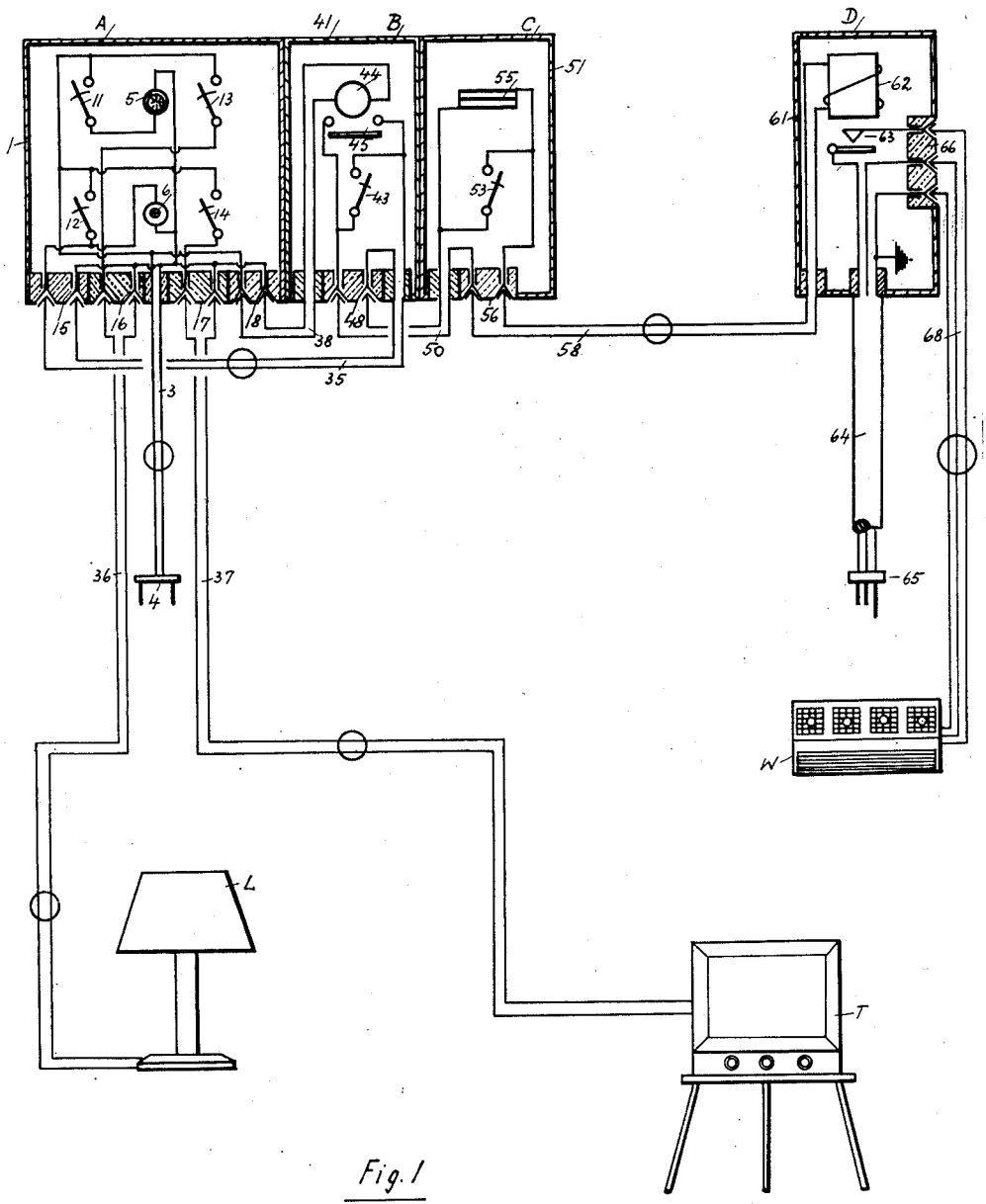
Fig. 1 shows a wiring diagram of a building-block type control system according to the invention applied to an example of various domestic appliances.

The control sytem shown in Fig. 1 is essentially composed of a main control box A, two accessory control boxes B, C, and a power relay box D. The system is shown applied, for example, for the control of a night lamp housed in box A, a separate lamp or lighting fixture L, a television receiver T, and an air conditioner W, for instance of the window-box type.

The control boxes A, B and C have all the same height and depth and are joined or mounted together in the desired combination so as to form a single compact unit. This composite unit, which may have a single mounting board, is installed for instance on the side wall of a night table or other wise within easy reach.

The relay box D, required for the control of the power current for the air conditioner W, may also be given a size matching the height and depth of the control boxes and may also be joined together with the control boxes to form a single mounting unit. However, it is preferred to install the relay box D at a separate place, for instance in the vicinity of the appliance to be controlled thereby; and it is then not necessary to limit the size of the relay control box to the small dimensions desirable for the components of the control box assembly.

The number and individual design and equipment of the control boxes may be varied in accordance with the requirements desired for any particular installation. The individual boxes are joined together either by screws or by securing them in juxtaposition on a common mounting board or surface, the fastening means being not illustrated as they do not differ from those conventionally available.

Figure 2:
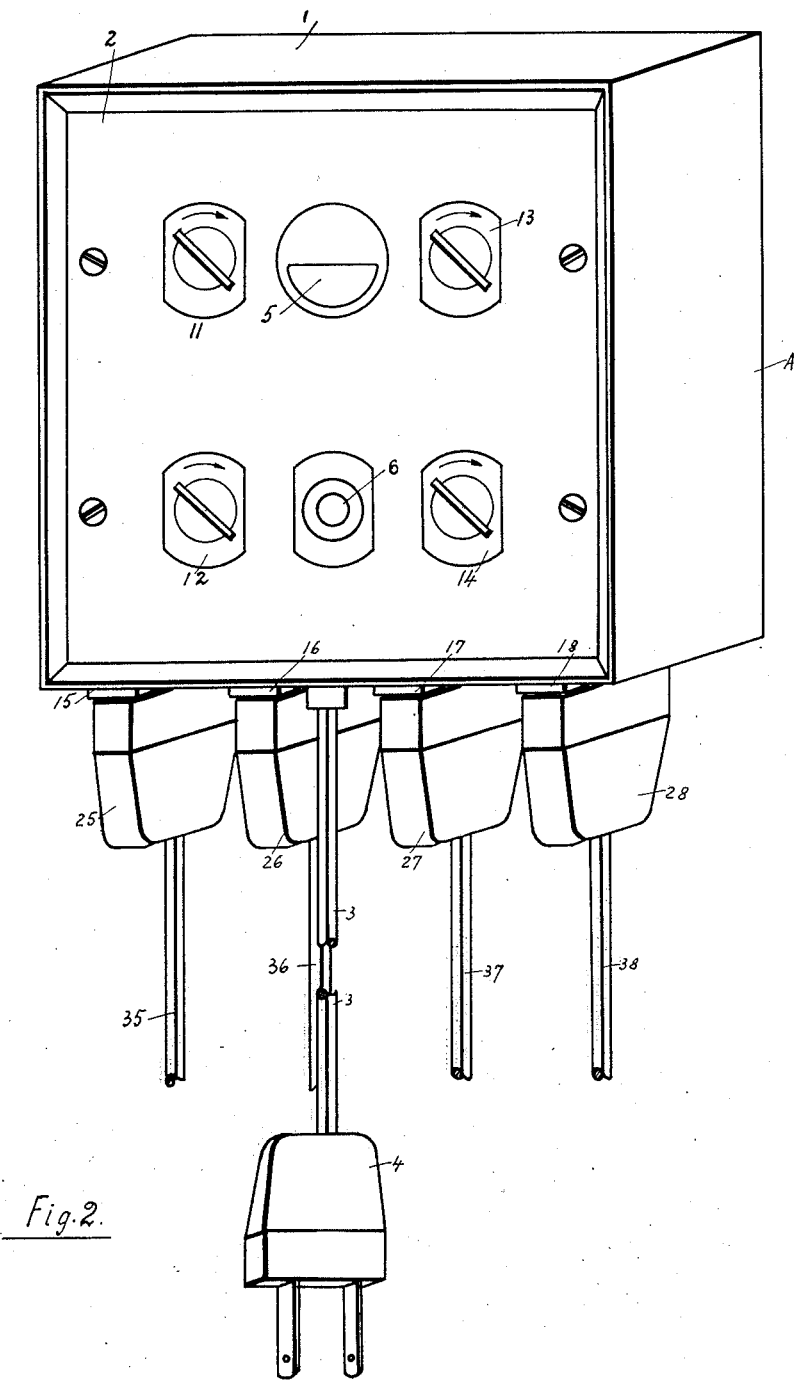
Figs. 2 to 5 illustrate in perspective the individual control boxes that make up the system of Fig. 1.

The main control box A, separately illustrated in Fig. 2, has a housing 1 preferably of sheet metal, covered by a removable face plate 2. The box is to be connected with the electric power supply by means of a two-wire cord 3 which is permanently attached to a box A and is equipped with a wall plug 4 to be inserted into any suitable outlet of the house wiring installation.

The face plate 2 of box A carries a night light 5, a pilot lamp 6 and four manual switchs 11, 12, 13, 14. The bottom wall of the box is equipped with four outlets 15, 16, 17, 18 (Fig. 1) suitable for the insertion of ordinary wall plugs 25, 26, 27, 28 (Fig. 2) respectively that are connected to respective two-wire cords 35, 36, 37, 38. Switch 11 controls the night light 5. Switch 12 controls the power supply to outlet 15 (Fig. 1). If box A is used alone, any appliance, for instance a radio reciever, may be connected to outlet 15 in order to be controlled by the switch 12. However, as shown in Fig. 1, the cord 35 of plug 25 (Fig. 2) is connected to the accessory control box B for a purpose described in a later place. Switch 13 controls the outlet 16 which, in the illustrated example, feeds the lamp L through plug 26 and cord 36. Switch 14 controls the outlet 17 feeding, for instance, the illustrated television receiver T through cord 37. Outlet 18 is directly connected with the wires of the power supply cord 3 and hence is not controlled by any of switches 11, 12, 13, 14.

Figure 3:
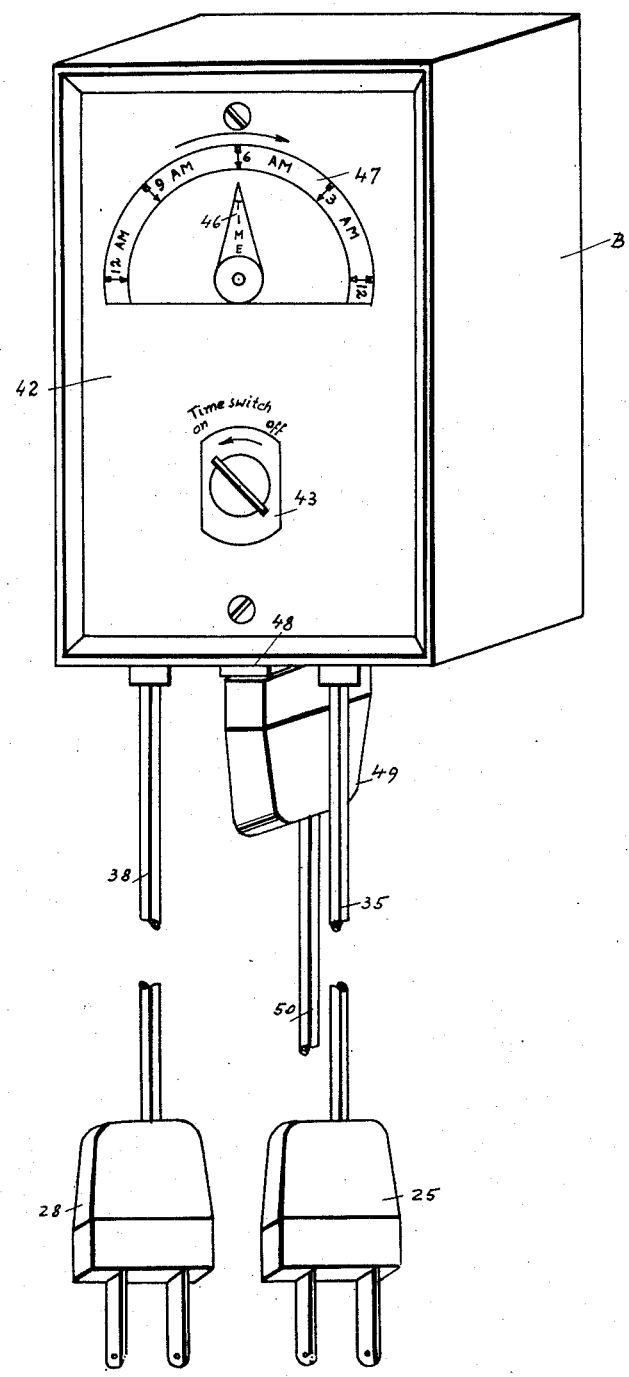

The insertion of box B into the system serves to make the system suitable for automatically timed operation of any desired appliance, in the present example of the air conditioner W. The housing 41 of box B carries a face plate 42 (Fig. 3) which is provided with a switch 43 mounted in the housing 41. Also mounted in housing 41 is a timing device comprising an electric clock mechanism 44 and a timing contactor 45 of conventional design. The timing period can be set as desired by means of a manually adjustable pointer 46 and a dial 47 mounted on face plate 42 (Fig. 3) The bottom portion of box B is provided with an outlet 48 to which the appliance being controlled can be attached by means of a plug 49 and a cord 50.

The timing mechanism 44 of control box B is connected by cord 38 and plug 28 with the outlet 18 of main control box A and thus is continuously supplied with electric current. The timing contact 45 and the manual switch 43 are connected by cord 35 and plug 25 with outlet 15 of main control box A and consequently are energized only when the manual switch 12 of main control box A is closed. The timing mechanism 44 is electrically effective to control the supply of current to cord 50 only when the switch 43 (Figs. 1, 3) is open. When switch 43 is closed, it bypasses the timing contact 45 so that the timing mechanism is ineffective. In this manner the timing device of box B can be set selectively either for automatic timing operation (switch 43 open and switch 12 closed) or for manual control (switch 43 open). Cord 50 may lead directly to the relay box D. In the illustrated embodiment, however, cord 50 is shown permanently connected with control box C. This box serves to make the composite system capable of thermostatic control of any desired appliance, in the present case of the air conditioner W.

Figure 4:
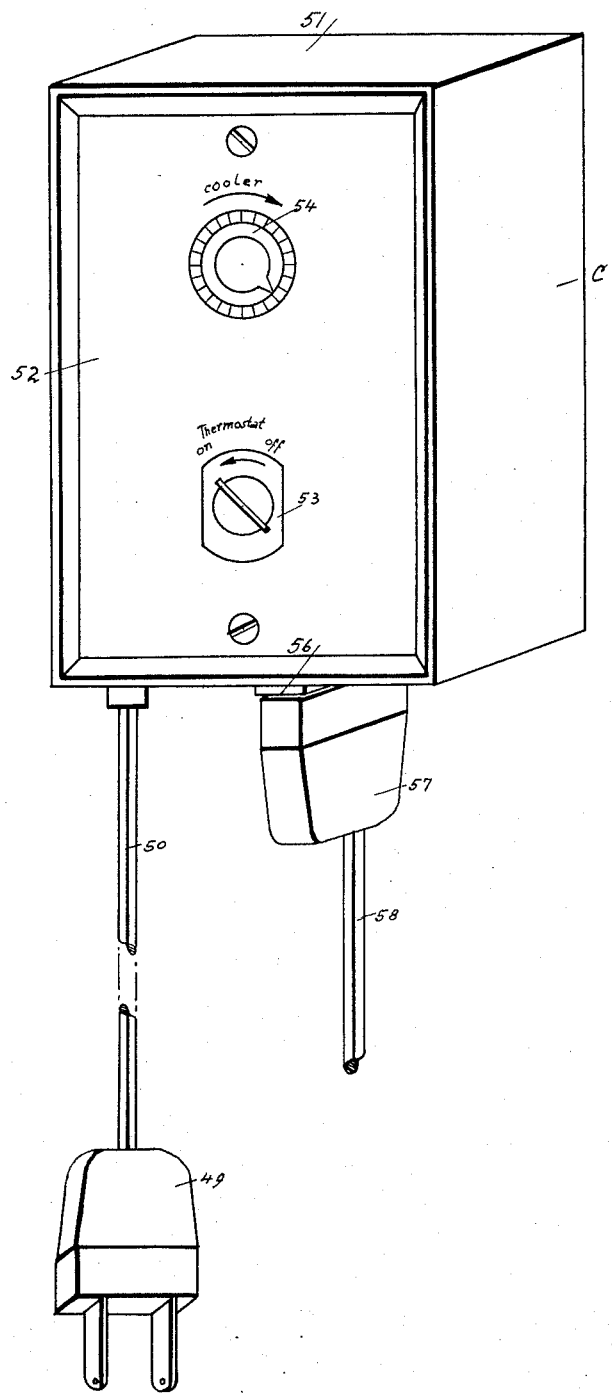

The housing 51 of accessory box C, separately shown in Fig. 4 is provided with a face plate 52 which carries a control switch 53 and also the temperatures setting member 54 of a thermostat switch 55 (Fig. 1). Switch 53 and thermostat 55 are connected to cord 50 (in parallel relation to each other), and control the supply of current to an outlet 56 in the bottom of box C. A plug 57 (Fig. 4) is shown inserted into outlet 56 for connecting the accessory box C by a two-wire cord 58 with the relay box D. When switch 53 is closed, it bypasses the thermostat 55; and the supply of current to cord 58 is then only controlled by the manual switch 12 in main box A or by the automatic timing device of accessory box B, depending upon the above-mentioned selected setting of switch 12 and 43. When switch 53 of box C is open, the thermostat 55 is effective to control the current supplied to cord 58 and thus also the operation of the air conditioner W. It will be understood therefore that, according to the illustrated example, the air conditioner W can be selectively controlled either manually by switch 12 of main box A, or automatically by the timing device of accessory box B, or thermally by the thermostat 55 of accessory box C, or jointly by the two automatic devices of boxes B and C, as may be desired.

Since air-conditioning units of the type shown are usually equipped with their own thermostatic control, it appears proper to mention the particular advantage achieved by the addition of control box C to the composite control system. The thermostatic control devices of air-conditioning window boxes are mounted in the air-conditioning apparatus itself or in its immediate vicinity and therefore respond to the temperature at a location remote from the bed in a bedroom or from the location that may usually be occupied by a patient, for instance. For that reason, a person involuntarily confined to a particular location may be inconvenienced by the temperature being too high or too low. However since a control assembly according to the present invention can readily be installed in the immediate vicinity of a location usually occupied, the thermostatic device of control box C responds to the temperature at that location and can be adjusted at will so as to control the air-conditioning unit in accordance with any particular preference.

Figure 5:
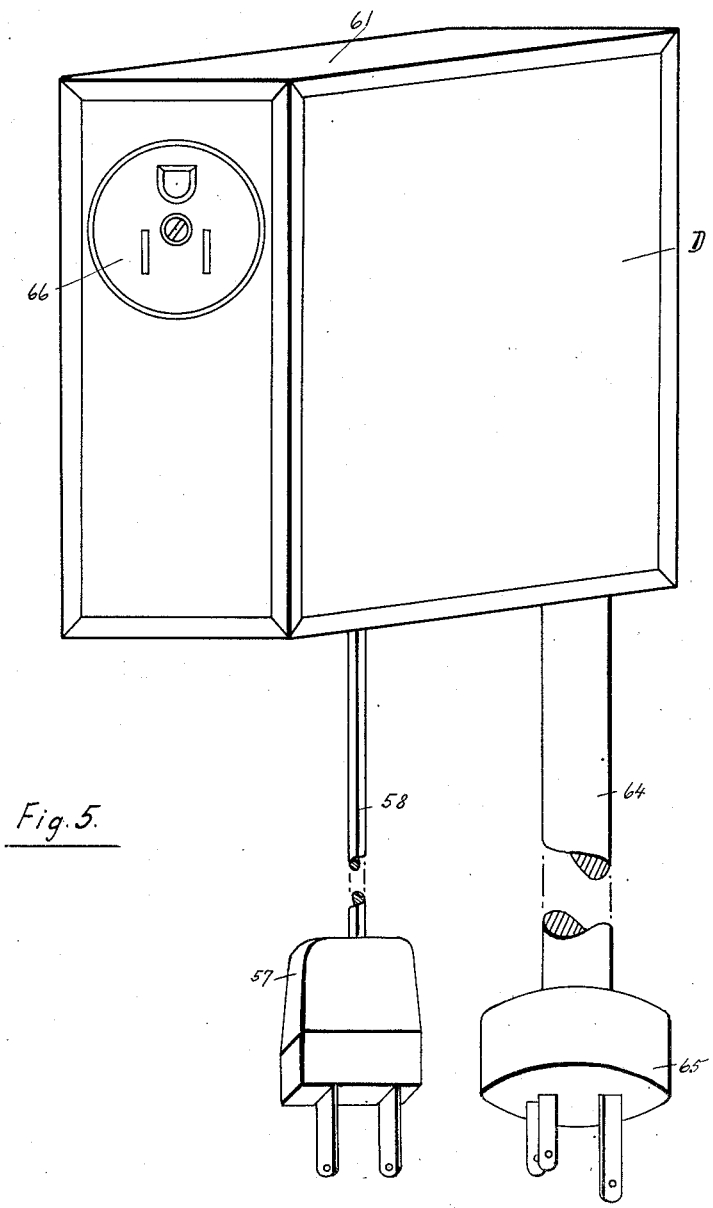

Relay box D (Figs. 1, 5) comprises a housing 61 which encloses a power relay, contactor or similar electromagnetic switch whose coil 62 is connected by cord 58 to the outlet 56 of box C. The contact assembly 63 of the contactor is connected to a three-lead power supply cord 64 with a polarized power supply plug 65 to be plugged into the proper wall receptacle usually necessary in the vicinity of air conditioners or other appliances of large power consumption. The contact assembly 63 controls the supply of power to a three-pole outlet 66 (Figs. 1, 5) for receiving a polarized plug of the three-wire cable 68 leading to the air conditioner W. Whenever the supply cord 58 is energized by the operation of thermostat in box C or of the timing device in box B, or by closing of the manual switch 12 in main box A, the contactor in relay box D picks up and closes its contact assembly 63 for energizing the air-conditioner unit W.

In a system according to Fig. 1 the control connections can readily be changed in various ways to suit any particular preference. For instance, when removing the plug of cord 35 from outlet 15 and instead inserting into outlet 15 the plug of cord 58 the relay box D for the air conditioner W is directly controlled by manual switch 12. To mention another possibility, the plug of cord 38 may then be removed from outlet 18 and the plug of cord 50 may instead be inserted into that outlet so that now the thermostatic control box C is in operation and is available for controlling some other appliance, for instance a space heater. It will also be apparent that further accessory control boxes may be added, for example if it is desired to control any additional appliance by another timing device or by another thermostatic control. On the other hand, main box A and box D may be used together without the timing device B. In this manner a large variety of combinations can be set up from few components in the manner of a building block system and this can be done by anyone without requiring professional skill, simply by plugging the individual units together in the particular combination needed for the desired purpose.

The design and equipment of the individual components, namely the control boxes and the relay box, can also be modified in various ways.

Thus, a timing device and thermostatic control device can readily be combined within a single control box as is shown in the embodiment of Fig. 6 where these two components form part of the main control box A.

The system illustrated in Fig. 6 is largely similar to that of Fig. 1 as is apparent from the use of identical reference characters for respectively similar circuit components. According to Fig. 6, the main control box A is equipped with a timing device comprising a clock mechanism 44 and a timing contact 45, and is also equipped with a thermostatic control switch 55 so that box A additionally performs the functions of the control boxes B and C shown in Fig. 1. In further distinction from Fig. 1, the main box A in Fig. 6 is not equipped with a night light 5 and the appertaining switch 11, but instead comprises a control switch 69 for controlling the supply of current to the outlet 18. A plug inserted into outlet 18 connects the current supply cord 3 through a cord 71 with an accessory control box E largely similar to box B in Fig. 1. That is, box E in Fig. 6 contains a second timing device whose clock work 144 is energized from cord 71 and controls the timing contact 145 connected to an outlet 146. Inserted into this outlet is a plug of a cord 147 for energizing an appliance H such as a hot-plate or radio receiver. The timing device in box E serves to de-energize the appliance H after it has been in operation a preset period of time from the moment when the appliance is switched on. When switch 69 in main box A closes, the timing contact 145 in box E is closed, the appliance A becomes energized, and the clockwork 144 in box E commences to run. After elapse of the predetermined time, the timing contact 145 opens and disconnects the appliance H. The relay box D for the air conditioner W is shown connected by a cord 72 to the outlet 15 of main control box A. In all other respects the system of Fig. 6 is similar to that of Fig. 1 and hence need not be further described.

The composite control-box system illustrated in Figs. 7 and 8 differs from those previously described with respect to the means by which the individual boxes are electrically connected with one another. The illustrations are limited to those features that distinguish this system from those described above, it being assumed that the interior of the boxes may correspond to the equipment used in the boxes of the embodiments already described and may be modified and arranged in any desired combination as explained.

The main box A according to Figs. 7 and 8 receives current through a cord 3 from a wall plug 4 to be inserted in a utility outlet. The main box A is provided with an electric male connector member 202 on one of its two lateral sides. The opposite side of control box A is provided with an electric female connector member 203. Two outlets 204 and 205 are shown mounted on the bottom side of the box A and are available for the connection of appliances to be controlled. It will be understood that the supply of current from cord 3 to the connector members and outlets of box A is controlled by the manual or other switching devices mounted in the box.

The accessory control boxes B, C and D have all the same size and, as far as the box housing, electrical connector members and outlets are concerned, have all the same design so that they can be joined with main box A in any desired combination and on either side of main box A. Box B has on one of its two lateral sides a female connector member which, when box B is joined with box A, is engaged by the male connector member 202 of box A. Consequently, when the two boxes are simply joined together mechanically, an electric connection between both is likewise established so that no connecting cords are necessary. The opposite lateral side of box B carries a male connector member 207. In the arrangement shown exploded in Fig. 8, this male connector member is covered by an insulating, dead plug 208 which is used only if no other accessory box is to be joined with box B.

Box C has a male connector member 217 which, in the assembled condition of the system, engages the connector member 203 of main box A. A female connector member 216 of box C is engaged by a male connector member 227 of box D when the system is assembled. Box D has another female connector member 226. Each of accessory boxes B, C and D is further equipped with an outlet 209, 219, or 229 for the connection of appliances to be controlled. The outlet 226 of box D is likewise available for the connection of an appliance. One of the accessory boxes may serve as a relay box as described above or, if preferred, a separate relay box may be added and may then be connected with the proper outlet of the assembled row of control boxes.

It will be obvious to those skilled in the art, on a study of this disclosure, that my invention permits of various other modifications and uses and hence may be embodied in designs and arrangements other than those specifically illustrated and described, without departing from the essence of my invention and within the scope of the claims annexed hereto.

I claim:

1. A control system for centralized remote control of electric appliances, comprising a row of control boxes of rectangular cross section, all having the same height and depth and being mechanically joined together in face-to-face relation to form a single unit for installation in a preferred location, a current-supply cord extending from a main one of said boxes and having at its end a connector plug for insertion into a utility power outlet, said boxes each carrying respective control-switch devices and being electrically plug-and-socket connected with an adjacent box of the row to receive current from said supply cord, at least one of the boxes having an automatic timing device, one of said switches being a manual by-pass switch in parallel with the timing device, and said boxes having respective outlets connected with said respective switch devices for connection of a desired combination of appliances to be controlled.

2. A control system for centralized remote control of domestic electric appliances, comprising a row of control boxes of rectangular cross section, all having the same height and depth and being mechanically joined together in face-to-face relation to form a single unit for installation in a preferred location, a current-supply cord extending from one of said boxes and having at its end a connector plug for insertion into a utility power outlet, each of said boxes having an electric male connector member on one of its sides and an electric female connector member on the opposite side whereby said boxes of said row are electrically interconnected with one another, said one box having said cord being electrically connected with one of said connector members for supplying current from said cord to all boxes of said row, each of said boxes having an outlet on a side other than those above mentioned and each carrying control-switch means connecting said outlet with one of said connector members of the same box, at least one of the boxes having an automatic timing device, one of said switches being a manual by-pass switch in parallel with the timing device, said outlets of said boxes being available for connection of a desired combination of appliances to be controlled.

3. A control system for centralized remote control of electric appliances, comprising a main control box and at least one accessory control box matching said main box so as to form a building-block type assembly together therewith, said boxes being mechanically joined together to form a single unit for installation near a preferred location, said main control box having a current supply cord with a connector plug for insertion into a utility power outlet, a plurality of branch circuits connected with said supply cord in said main box, said main box having a plurality of outlets and having manually controllable switch means selectively connecting said outlets with said respective branch circuits, said accessory control box having plug means for connection with one of said respective outlets of said main box and carrying an automatic time-controlled switching means, the manually controllable switch means of the main box being settable for on-and-off control of the time-controlled switching means, said accessory control box having an outlet connected by said time-controlled switching means with said plug means, the outlets of said boxes other than said one outlet of said main box being available for connection to a desired combination of appliances to be controlled.

4. A control system for centralized remote control of domestic electric appliances, comprising a main control box and a plurality of accessory control boxes matching said main box so as to form a building-block type assembly together therewith, said boxes being mechanically joined together to form a single unit for installation near a preferred location, one of said boxes having a current supply cord extending from the box and provided at the remote cord end with a connector plug for insertion into a utility power outlet, said boxes having respective plug-and-socket connections forming an electric through connection from said cord through all said boxes, said main box having a plurality of outlets and having manually controllable switch means selectively connecting said outlets with said cord, and said accessory boxes having each an automatic switching means and an outlet connected with said cord by said latter switching means, said automatic switching means including a thermostat control device and a time-responsive device, said outlets of said boxes being available for connection of a desired combination of appliances to be controlled, including an air-conditioning unit controlled by the automatic switching means.

5. A control system for centralized remote control of electric appliances, comprising a main control box and at least one accessory control box matching said main control box so as to form a building-block type assembly together therewith, said boxes being mechanically joined together to form a single unit for installation near a preferred location, said main control box having a current supply cord extending from said main box and provided with a connector plug for insertion into a utility outlet, a plurality of branch circuits connected with said supply cord in said main box, said main box having a plurality of outlets and having manually controllable switch means selectively connecting said outlets with said respective branch circuits, said accessory control box having a connecting plug engaging one of said respective outlets of said main box, an automatic switching device in said accessory box, said accessory box having an outlet connected with said latter plug through said switching device, and a manual switch disposed in said accessory control box and connected with said automatic switching device for on and off control of said device, one of the manually controllable switches of the main box being settable to de-energize the said automatic switching device and the manual switch disposed in said accessory box.

6. A control system for centralized remote control of electric appliances, comprising a main control box and at least one accessory control box matching said main control box so as to form a building-block type assembly together therewith, said boxes being joined together to form a single unit for installation near a preferred location, said main control box having a current supply cord with a connector plug for insertion into a utility outlet, a plurality of branch circuits connected with said supply cord in said main box, said main box having a plurality of outlets and having manually controllable switch means selectively connecting said outlets with said respective branch circuits, said accessory control box having a plug connected with one of said respective outlets of said main box, an electric timing device mounted in said accessory box and having a switch contact, the manually controllable switch means of the main box being settable to de-energize the said switch contact, and said accessory box having another outlet connected with said latter plug through said contact.

7. A control system for centralized remote control of electric appliances, comprising a main control box and at least one accessory control box matching said main control box so as to form a building-block type assembly together therewith, said boxes being joined together and forming a single unit for installation near a preferred location, said main control box having a current supply cord with a connector plug for insertion into a utility outlet, a plurality of branch circuits connected with said supply cord in said main box, said main box having a plurality of outlets and having manually controllable switch means selectively connecting said outlets with said respective branch circuits, said accessory control box having a plug connected with one of said respective outlets of said main box, and said accessory control box comprising an adjustable heat-responsive switching device and having another outlet connected with said latter plug through said switching device, the manually controllable switch means of the main box being settable for on-and-off control of the heat-responsive switching means.

8. A control system for centralized remote control of electric appliances, comprising a main control box and a plurality of accessory control boxes so as to form a building-block type assembly together therewith, said boxes being joined together in a row to form a single unit for installation near a preferred location, said main box having a current supply cord extending from said main box, said cord having a connector plug for insertion into a utility outlet, a plurality of branch circuits connected with said supply cord in said main box, said main box having a plurality of outlets and having manually controllable switch means selectively connecting said outlets with said respective branch circuits, each of said accessory boxes having at least one outlet and being plug-connected with an outlet of a preceding box of said row to be supplied with current from said preceding box, and each of said accessory boxes having automatic switching means for controlling the supply of said current to an outlet of the same accessory box, the remaining outlets of said boxes being available for connection of a desired combination of appliances to be controlled.

9. A system according to claim 3, comprising another accessory box plug-connected with an outlet of one of the other boxes to receive control current therefrom, a relay disposed in said other accessory box to receive said control current, said other box having a power supply cable extending away from said other box and having a plug for insertion into a power-supply utility outlet, said other box having a power outlet for attachment of a power appliance, and said relay having switch means connecting said cable with said power outlet under control by said control current.

10. A control system for centralized remote control of electric appliances, comprising a main control box and at least one accessory control box matching said main control box so as to form a building-block type assembly together therewith, said boxes being joined together to form a single unit for installation near a preferred location, said main box having a current supply cord extending from said main box, said cord having a connector plug for insertion into a utility outlet, a plurality of branch circuits connected with said supply cord in said main box, said main box having a plurality of outlets and having manually controllable switch means selectively connecting said outlets with said respective branch circuits, said accessory box being electrically connected with one of said respective main-box outlets and comprising an automatic switching device and another outlet connected with said one main-box outlet through said switching device, a relay box separate from said control box assembly and having a connecting cord extending to said assembly, said latter cord being connected with said outlet of said accessory box, the manually controllable switch means of the main box being settable for on-and-off control of the electromagnetic contact device, said relay box comprising an electromagnetic contact device having a coil circuit connected with said latter connecting cord, a power supply cable extending out of said relay box and having a plug for insertion into a power-supply utility outlet, said relay box having a power outlet for attachment of a power appliance, and said contact device having switch means connecting said cable with said power outlet.

11. In a control system according to claim 3, said main control box carrying automatic switching means in addition to said manually controllable switch means and connecting said current supply cord with one of the outlets other than those controlled only by said manual switch means.

12. In a control system according to claim 3, said main control box comprising a built-in electric appliance and having a switch connecting said appliance with said current supply cord.

13. A control system for centralized remote control of electric appliances, comprising a main control box having a current supply cord with a connector plug for insertion into a utility outlet and having a number of outlets and switching devices selectively connecting said respective outlets with said current supply cord, a power relay box having a connecting cord connected with one of said outlets, said relay box comprising an electromagnetic switching device having a coil circuit connected with said latter connecting cord, a power supply cable extending out of said relay box and having a plug for insertion into a power-supply utility outlet, said relay box having a power outlet for attachment of a power appliance, and said electromagnetic switching device having contact means connecting said cable with said power outlet.

14. A control system for centralized remote control of electric appliances, comprising a control apparatus having a current supply cord, a plurality of branch circuits connected with said supply cord in said apparatus, said apparatus having a plurality of outlets and having manually controllable switch means selectively connecting said outlets with said respective branch circuits, said apparatus having an automatic thermostatic switching means and an automatic timing device each electrically connected to and deenergizable by the manually controllable switch means, a relay box separate from said control apparatus and having a connecting cord extending to one of said outlets thereof, said outlet being connected to and under control of the manually controllable and thermostatic switching means and the automatic timing device, said relay box comprising an electromagnetic contact device having a coil circuit connected with said latter connecting cord, a power supply cable extending out of said relay box and having a plug for insertion into a power-supply utility outlet, said relay box having a power outlet for attachment of a room air conditioner, and said contact device having switch means connecting said cable with said power outlet.

No references cited.